March 5, 1963

F. G. BACK 3,079,851

AUTOMATIC EXPOSURE CONTROL FOR CAMERAS

Filed Aug. 24, 1959

INVENTOR.
Frank G. Back
BY Albert F. Kronman
ATTORNEY

March 5, 1963  F. G. BACK  3,079,851
AUTOMATIC EXPOSURE CONTROL FOR CAMERAS
Filed Aug. 24, 1959  3 Sheets-Sheet 2

INVENTOR.
Frank G. Back
BY Albert F. Kronman
ATTORNEY

March 5, 1963 F. G. BACK 3,079,851
AUTOMATIC EXPOSURE CONTROL FOR CAMERAS
Filed Aug. 24, 1959 3 Sheets-Sheet 3

INVENTOR.
Frank G. Back
BY *Albert F. Kroman*
ATTORNEY

United States Patent Office 3,079,851
Patented Mar. 5, 1963

3,079,851
AUTOMATIC EXPOSURE CONTROL
FOR CAMERAS
Frank G. Back, 55 Sea Cliff Ave., Glen Cove, N.Y.
Filed Aug. 24, 1959, Ser. No. 835,635
9 Claims. (Cl. 95—64)

This invention relates to an automatic exposure control device which can be preset to allow for both film speed and exposure time on film cameras or set for the characteristics of orthicon tubes in television cameras. The invention has particular reference to the automatic setting of two optical wedge discs disposed in the path of light entering the camera.

Many automatic exposure controls have been designed and used in order to produce the correct amount of illumination within a camera. Most of these prior art devices include a system for gathering light from the general direction of the object or scene to be photographed or televised. Other known devices gather light from around the area to be photographed. The control means in presently known structures opens or closes an iris diaphragm to control the amount of transmitted light. Such systems suffer from at least three disadvantages. In the first place, they do not gather light in proportion to the usable light in the object area. In the second place, the control of the transmitted light is by an iris diaphragm or its equivalent and some lens systems cannot be controlled by such a means. The present system employs two rotary optical wedges which, without reducing the lens aperture at any time, vary the light transmission by interposing a variable transmission component whose light transmission is constant over the entire field. In the third place, prior art devices require additional computation to correct for film speed, tube characteristics and exposure time. The present invention contains means whereby an automatic exposure means can be set by two simple controls to make the proper allowance for film speed, tube characteristics and exposure time.

One of the objects of this invention is to provide an improved automatic exposure control for photographic and television cameras which avoids one or more of the disadvantages and limitations of prior art arrangements.

Another object of the invention is to reduce the time needed for controlling the transmitted light entering a camera.

A further object of the invention is to provide an exposure control suitable for any type of lens system, such as dioptric or katadioptric.

An object of the invention is to provide a separate control means for setting an indicator knob to the film speed and exposure time or orthicon tube characteristic with automatic adjusting means controlled thereby for correct compensation.

Another object of the invention is to control the exposure of a camera by sampling the light entering it without the necessity of an additional lens system.

The invention includes a glass plate beamsplitter which transmits a large percentage of light. A small percentage of light is reflected by the glass plate to a measuring photo-electric transducer which transforms the light into an electric current. A calibrated lamp is employed to illuminate a reference photo-electric cell which is coupled to the measuring cell in a subtractive manner. The combination of these two cells produces an error voltage, plus or minus, which is chopped, amplified and applied to a servo motor. The calibrated lamp is connected to a regulated power supply in series with two attenuators, one of which is adjustable for film speed and the other of which is adjustable for the predetermined exposure time. The servo motor drives two circular optical wedges which are rotated in opposite directions. A portion of each wedge is interposed in the main light path in front of the beamsplitter.

For a better understanding of the present invention, together with other and further objects thereof, reference is made to the following description taken in connection with the accompanying drawings, in which.

Figures 1, 2:
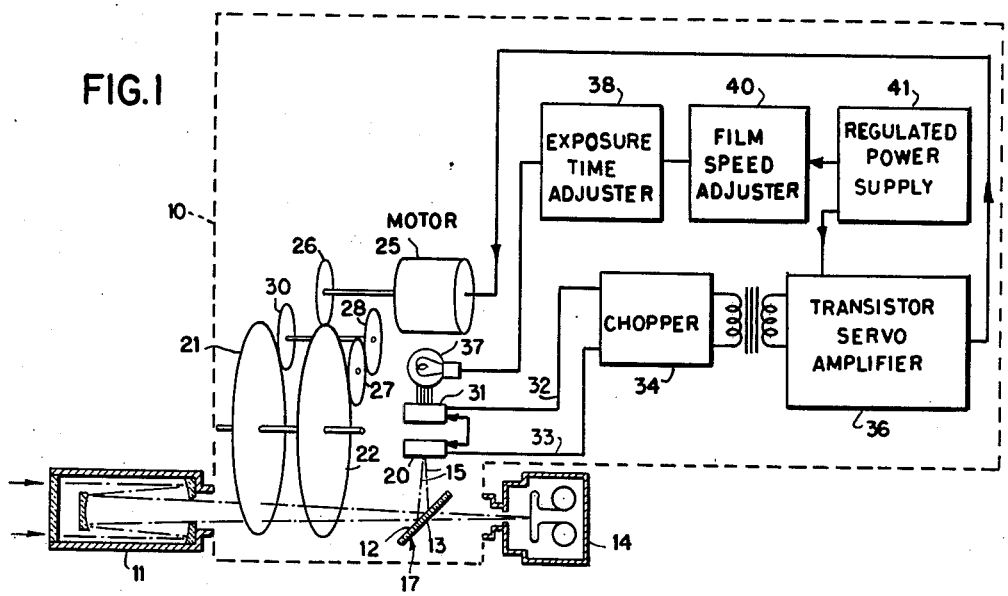
FIGURE 1 is a schematic diagram showing all the components of the present device with some of the circuits shown in block.
FIGURE 2 is an elevational view of the exposure control housing with the cover removed showing the servo motor, the power supply, the photocell housing, and the settable switches.

Referring to the drawings, 10 indicates a main housing having a camera lens system 11 secured within an opening 10a on the front thereof, and a camera 14 held in register with a second opening 75 in the back of the housing and opposite the first opening. The lens system can be a refracting, reflecting or catadioptric system.

In order to sample the amount of illumination furnished by the lens system 11, a beamsplitter 17 in the form of a glass plate reflector, is mounted at an angle to the optical axis of the camera 14. The glass plate reflects 4% of the light incident thereon from each surface 12, 13 or 8% of the said light. The remainder of the incident light, is transmitted and enters the camera 14. The reflected rays 15 pass through an opening 18 in the housing 10 and are incident upon a light transducer 20 which may be any type of circuit component having suitable performance characteristics which transforms light into electric current.

Figure 3:
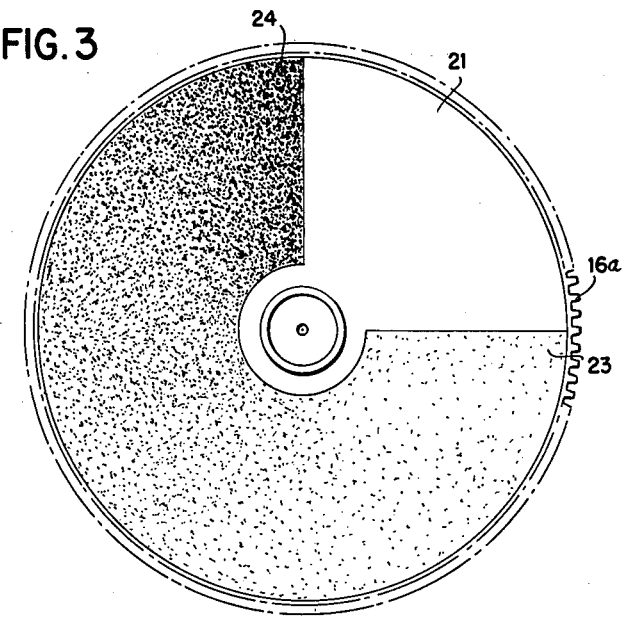
FIGURE 3 is a plan view of a circular optical wedge according to the present invention.
Figure 4:
FIGURE 4 is a cross sectional view of the wedge shown in FIGURE 3.
Figure 5:
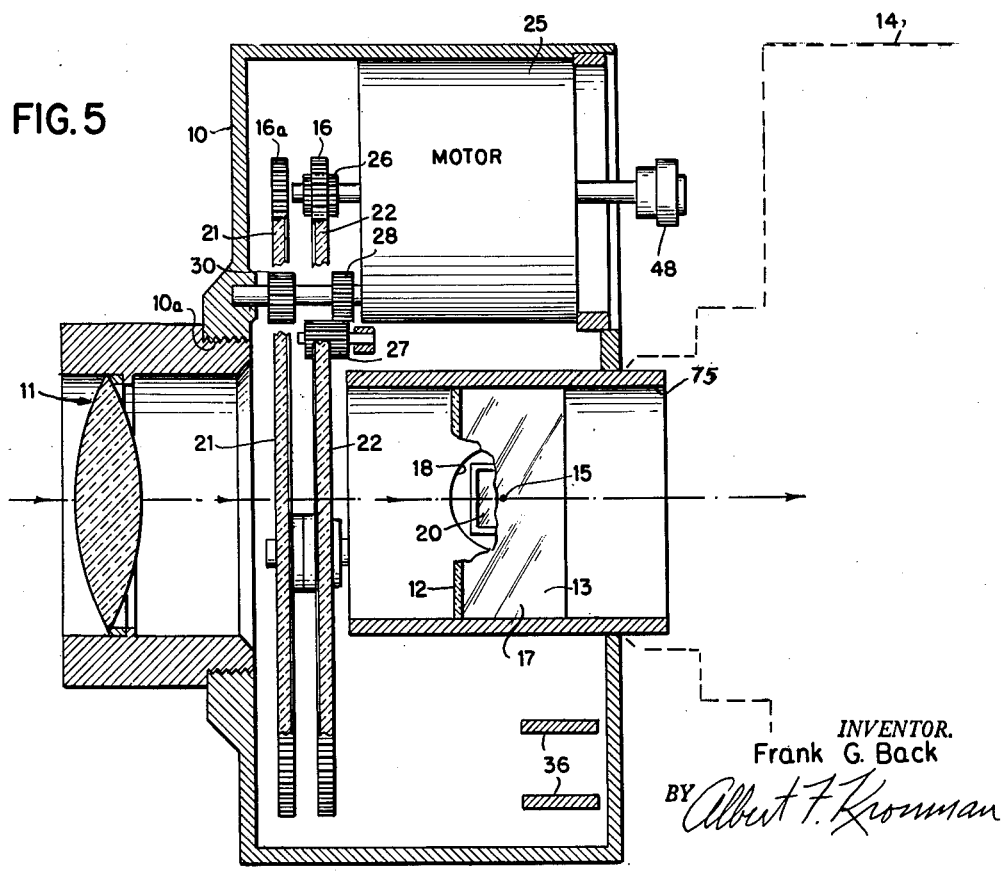
FIGURE 5 is a sectional view of the housing shown in FIGURE 2, taken along line 5—5, showing the location of several of the important optical components.

In order to control the illumination entering the camera, two circular optical wedges 21 and 22 are provided with a portion of their area interposed in the entrant light beam. Each circular wedge is treated with a suitable graduated light-reducing coating having a linear gradient density which varies from a very light covered area 23 (FIGURE 3) which transmits about 95% of the light to a very dense area 24 which transmits only about 1% of the light. The graduation from area 23 to area 24 is made substantially linear as regards the reciprocal logarithm of light transmission so that when two of these wedges are positioned adjacent to each other in parallel relationship, but with their graduations extending in opposite directions, the result is a light transmitting combinaion which transmits the same percentage of light over the entire field. As will be evident from FIGURES 1 and 5, the two wedges 21 and 22 are driven by a motor 25 which is reversible and which is coupled to wedge 22 by a small pinion 26. The pinion is in mesh with a ring gear 16 around the wedge 22. The ring gear on wedge 22 is also coupled to an idler gear 27 which in turn engages a second pinion 28 which drives a third pinion 30 coupled to the ring gear 16A on wedge 21. As a result of this train of gears, when motor 25 turns wedge 22 in one direction, wedge 21 is turned in the opposite direction. It will be obvious from the above description that the two circular wedges, acting in reverse directions, provide adjustable light transmission for the entrance rays of light but maintain the same percentage of light transmission over the entire optical field.

Figure 6:
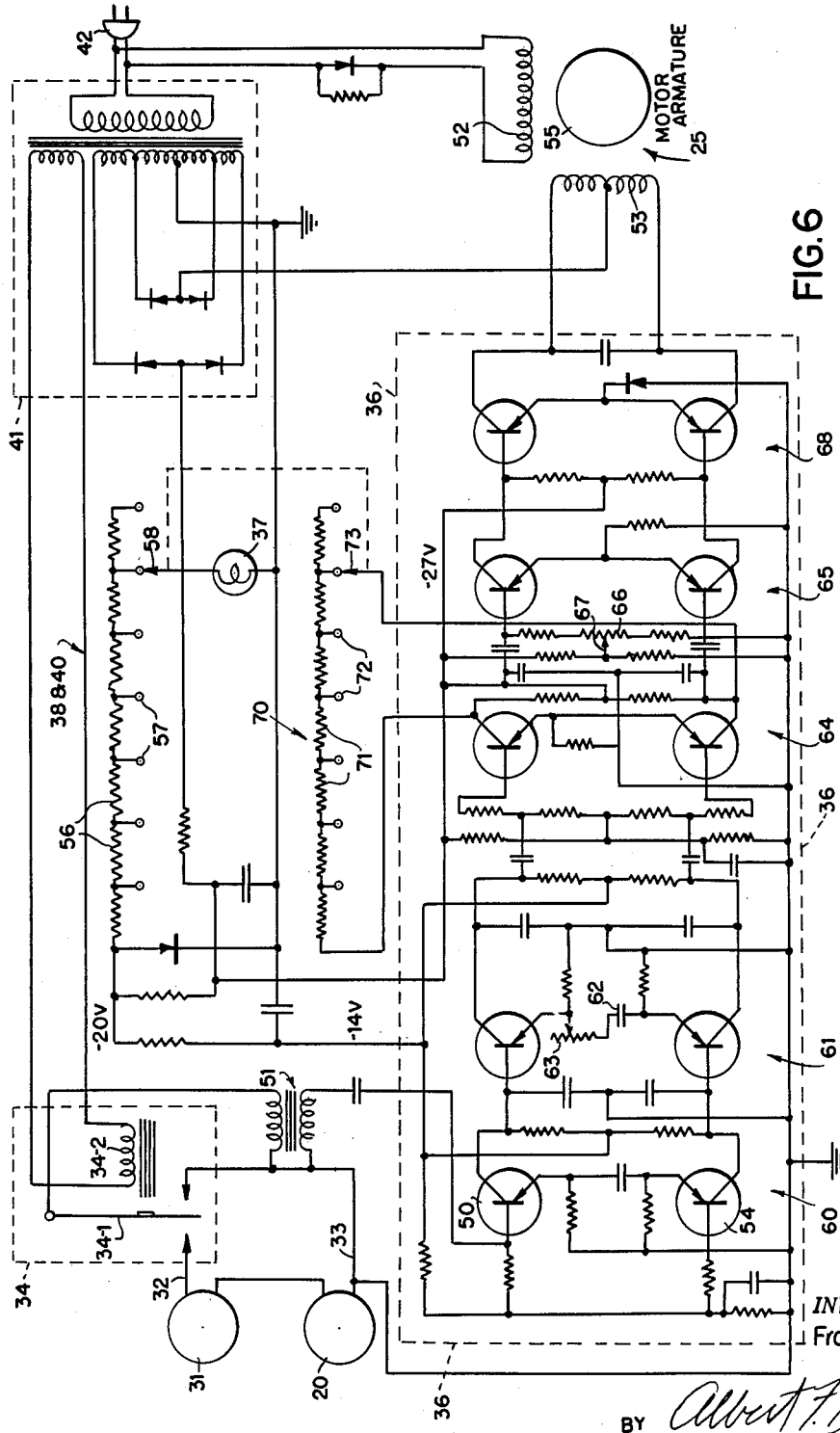
FIGURE 6 is a schematic diagram of connections showing the wiring details of the electric circuit elements.

Light transducer 20 (FIGURE 1) is connected to a second transducer 31 which is similar in operating characteristics to transducer 20. These two transducers are connected in series arrangement so that the voltage produced on their output conductors 32 and 33 is proportional to the difference in the amount of illumination incident upon each transducer. This voltage is applied to a chopper 34 which changes the direct current voltage received from the transducers into a series of alternating voltage pulses of 60 cycles frequency. The chopper 34 is run by an alternating current supply which has the same frequency as the supply furnished to one winding of the motor 25. Details of one form of chopper which may be used in this arrangement are shown in FIGURE 6. This conversion from direct current to alternating current is for convenience only, since alternating currents can be amplified and controlled much easier than direct currents.

Transducer 31 is mounted adjacent to an adjustable source of illumination which may be a small electric lamp 37. This lamp is connected in series with two attenuators 38 and 40 and a source of electric power 41 which may be a regulated power supply connected by a plug 42 to a source of alternating current power. Attenuators 38 and 40 work in relation to each other and may be ordinary variable resistors or any other type of adjustable electrical component which changes the impedance of an electric circuit. Attenuator 38 may be calibrated to read in exposure times, these times corresponding to the predetermined time of exposure which will be given to the film within the camera. Attenuator 40 may also be a simple adjustable resistor and its indicating means calibrated to read values of film speed, these values corresponding to the speed coefficients of the film placed within the camera. For convenience, the resistors in circuit components 38 and 40 may both be connected to taps on the rotary switch 46 controlled by the knob 43 and a movable disc 44 (see FIGURE 2).

The operation of this exposure control is as follows: The camera is loaded with film and the exposure time adjuster set and the film speed adjuster 40 is set also. Power is applied to circuits 41, 40, 38 and lamp 37, the resulting illumination produced by lamp 37 being controlled by the resistors in circuit components 38 and 40. When the other circuit components are activated, the focused rays of light 15 deflected by beamsplitter 17 produces a value of illumination on transducer 20 which is proportional to the light entering the camera. This illumination minus the illumination furnished by lamp 37, produces a voltage value on conductors 32 and 33 which is proportional to the difference between the two light values. This voltage is chopped and then amplified by amplifier 36 and applied to reversible motor 25 which turns the two circular wedges 21 and 22 until the value of illumination received by transducer 20 is equal to the amount of illumination received by transducer 31 from lamp 37. When these two transducers produce the same voltage their output is zero and no voltage is applied to the amplifier or to motor 25. This is the condition for adjusted light of the desired value and the camera can be operated. If now the camera is pointed toward another object which produces more light, the transducer 20 receives more light and amplifier 36 sends a current to motor 25 which turns wedges 21 and 22 so that the percentage of light transmission is reduced and the illumination falling on transducer 20 is again equal to the illumination on transducer 31.

Referring now to FIGURE 6, the chopper 34 includes a polarized vibrating reed 34–1 which is driven by a small solenoid having a winding 34–2 coupled to the main power supply 41. The reed makes alternate contact with conductors 32 and 33. When the reed is in contact with conductor 32 the current resulting from both transducers 20 and 31 is applied to the base of transistor 50 through transformer 51. When the reed 34–1 is in contact with conductor 33 it connects the base of the transistor to the ground to provide a voltage reference base. The voltage pulses applied to amplifier 36 through transformer 51 may be either positive or negative, depending upon the amount of light incident upon the two transducers. If transducer 31 receives the greater amount of light, the pulses will be positive, if transducer 20 receives the greater amount, the pulses will be negative, and if both transducers receive the same amount, the chopper output is zero.

FIGURE 6 shows the details of one of the arrangements which may be used to give the desired control action. Motor 25 in this circuit is a two phase motor having one winding 52 which is connected directly to the A.C. source of supply 42 while a second winding 53 is connected to the output of amplifier 36. The center tap of this winding is connected to a source of direct current potential in power supply 41 for supplying current to the output stage transistors. The two channels of amplification which start with transistors 50 and 54 are adjusted to produce current pulses in the output winding which are ninety electrical degrees from the pulses in winding 52. The combination of these two produces a two phase flux which turns the motor armature 55.

The film speed adjuster 40, as described above may be a variable resistor which adjusts the illumination of lamp 37 to compensate for film speed. The exposure time adjuster works with the film speed adjuster. In FIGURE 6, a single set of resistors 56 is used for both adjusters. The resistors 56 and the associated contact points 57 are mounted in a switch barrel 46 (see FIGURE 2) which is connected to disc 44 and is manually rotatable. Switch contact 58 is connected to knob 43 and is also manually adjustable. One of the scales (either one) is marked on housing 10 and the disc 44 has a pointer which is set on the scale for one of the values desired (exposure time or film speed). The other scale is marked on the dial 44 on the housing and the pointer 45 on knob 43 is set on this scale to the desired value. Amplifier 36 may be a vacuum tube amplifier or a series of transistor stages as shown in FIGURE 6. The first stage 60 contains two transistors 50 and 54, with the base of transistor 50 connected to the secondary winding of input transformer 51 and the base of transistor 54 grounded through a resistor. The output of the second stage 61 includes a combination capacitor 62 and variable resistor 63 for varying the phase angle between the pulses supplied by motor winding 52 and motor winding 53.

Amplifier stages 64 and 65 are coupled together with the usual circuit elements except that a resistor 66 is provided with a sliding contact 67 to balance the two rows of transistors and provide zero output flux in winding 53 when the input voltage is zero. The amplifier output stage 68 has two transistors, each with its collector connected to one side of motor winding 53.

Experience has shown that the exposure control functions at its maximum efficiency when the percent change in illumination on transducers 20 and 31 produces a corresponding change in motor current. Since the illumination is variable over a wide range of values, a compensation means is desirable to alter the sensitivity of the amplifier as the illumination changes. To accomplish this a variable resistor 70 is connected between the two collectors of the transistors in stage 64. The variable resistor includes resistor components 71 connected between contact points 72 which are engaged by moving contact 73. Contact 73 is coupled to contact 58 so that when adjusters 38 and 40 are varied the sensitivity of the amplifier is changed accordingly.

When contact 58 is moved to the left as shown in FIGURE 6, the lamp becomes brighter and the illumination on transducer 31 is raised. At the same time resistor 70 is decreased and the sensitivity of the amplifier is reduced.

It will be obvious from the above description that the system herein described not only adjusts for the illumination entering a camera but also can be altered to include the film speed and exposure times set by an operator or, in the case of television cameras, the characteristics of the orthicon tube. It is also obvious that an additional lens system is not required, the apparatus working directly from the light supplied through the main camera lens.

Exposure control may be regulated when no power is available for the motor 25 by turning knob 48 attached to the motor shaft.

Having thus fully described the invention, what is claimed as new and desired to be secured by Letters Patent of the United States is:

1. An automatic exposure control device for cameras comprising, a housing, a first opening in the front of said housing adapted to receive a lens system, a second opening in the rear of the housing opposite the first opening to receive a camera, a beamsplitter angularly disposed across the optical axis of the lens system within the housing between the first and second openings to reflect a portion of the light entering the housing away from the optical axis of the lens system and transmit the remainder of the light to the camera, a first photo-electric transducer within the housing positioned to receive said reflected light and adapted to produce a first electrical voltage, a second photo-electric transducer within the housing, a controlled source of light directed to the second transducer to produce a second electrical voltage for balancing the first, a chopper to receive and convert said voltages to an alternating voltage 90 degrees out of phase with an external source of alternating current power, a servo amplifier having its input connected to said chopper for amplifying the difference between said first and second voltages, said amplifier producing alternating current proportional to the difference between the amounts of illumination incident upon said first and second transducers, a variable transparency device interposed in the path of the light beam in front of the beamsplitter, said device adapted to change its transparency when rotated, and a multiphase motor connected to the output of the amplifier and to said source of power and mechanically coupled to the variable transparency device for changing the amount of light transmitted to the camera by the lens system and beamsplitter.

2. An automatic exposure control device for cameras comprising a housing, a first opening in the front of said housing adapted to receive a lens system, a second opening in the rear of the housing opposite the first opening to receive a camera, a glass plate beamsplitter angularly disposed across the optical axis of the lens system within the housing between the first and second openings to reflect a portion of the light entering the housing away from the optical axis of the lens system and transmit the remainder of the light to the camera, a first photo-electric transducer within the housing positioned to receive said reflected light and adapted to produce a first electrical voltage, a second photo-electric transducer within the housing, a controlled source of light directed to the second transducer to produce a second electrical voltage for balancing the first, a chopper to receive and convert said voltages to an alternating voltage having the same frequency as an external source of alternating current but 90 degrees out of phase with it, circuit means connected to said chopper for amplifying the difference between said first and second voltages, a variable transparency optical wedge device in front of the beamsplitter interposed in the path of the light beam, said device adapted to change its transparency when rotated, and a multiphase reversible motor connected to said circuit means and said external source with its shaft coupled to the variable transparency device for changing the amount of light transmitted to the camera by the lens system and the beamsplitter.

3. An automatic exposure control device for cameras, comprising a housing, a first opening in the front of said housing adapted to receive a lens system, a second opening in the rear of the housing opposite the first opening to receive a camera, a glass plate beamsplitter angularly disposed across the optical axis of the lens system within the housing between the first and second openings to reflect a portion of the light entering the housing away from the optical axis of the lens system and transmit the remainder of the light to the camera, a first photo-electric transducer within the housing positioned to receive said reflected light and adapted to produce a first electrical voltage, a second photo-electric transducer within the housing, a controlled source of light directed to the second transducer to produce a second electrical voltage for balancing the first, a chopper which receives and converts the difference between said voltages into an alternating current voltage having the same frequency as an external source of power but out of phase with said source, and control means including a multiphase motor connected to said chopper and to said external source for operating a light transmission means to control the amount of light transmitted by the lens system to the camera.

4. An automatic exposure control device for cameras comprising, a housing, a first opening in the front of said housing, adapted to receive a lens system, a second opening in the rear of the housing opposite the first opening to receive a camera, a glass plate beamsplitter angularly disposed across the optical axis of the lens system within the housing between the first and second openings to reflect a portion of the light entering the housing away from the optical axis of the lens system and transmit the remainder of the light to the camera, a first photo-electric transducer within the housing positioned to receive said reflected light and adapted to produce a first electrical voltage, a second photo-electric transducer within the housing, a controlled source of light directed to the second transducer to produce a second electrical voltage for balancing the first, a chopper to receive and convert said voltages to an alternating voltage having the same frequency as an external source of alternating current power but out of phase with said power, a servo amplifier having its input coupled to said chopper for amplifying the difference between said first and second voltages, said amplifier producing an output alternating current proportional to the difference between the intensities of illumination incident upon said first and second transducers, a variable transparency device within the housing in front of the beamsplitter interposed in the path of the transmitted light beam, said device adapted to change its transparency when rotated, and a reversible two phase motor connected to the output of the amplifier and to said external source with its shaft coupled to the variable transparency device for changing the amount of light transmitted to the camera by the lens system and beamsplitter.

5. An automatic exposure control for cameras as set forth in claim 4 wherein said source of electric power is modulated by an attenuator which can be manually set to compensate for variable time exposure intervals.

6. An automatic exposure control for cameras as set forth in claim 4 wherein said source of electric power is modulated by an attenuator which can be manually set to compensate for camera film speeds.

7. An automatic exposure control for cameras as set forth in claim 4 wherein said source of electric power is connected to said light source in series with two manually variable resistors, one of said resisors compensating for the exposure time and the other of said resistors compensating for the camera film speed.

8. An automatic exposure control for cameras as set forth in claim 4 wherein said variable transparency device includes two circular discs, each having circumferentially disposed areas of variable transparency, said discs mechanically coupled to each other for opposite rotation.

9. An automatic exposure control device for cameras comprising, a housing, a first opening in the front of said housing adapted to receive a lens system, a second opening in the rear of the housing opposite the first opening to receive a camera, a glass plate beamsplitter angularly disposed across the optical axis of the lens system within the housing between the first and second openings to reflect a portion of the light entering the housing away from the optical axis of the lens system and transmit the remainder of the light to the camera, a first photo-electric transducer within the housing positioned to receive said reflected light and adapted to produce a first electrical voltage in proportion to the light intensity, a second photo-electric transducer within the housing, a controlled source of light directed to the second transducer to produce a second electrical voltage in proportion to the light intensity from the controlled light source for balancing the first, a chopper to receive and convert said voltages to an alternating voltage having the same frequency as an external source of alternating current power, said chopper actuated by the external source of power and adapted to produce an alternating voltage substantially 90 degrees out of phase with said external power, a servo amplifier having it input coupled to said chopper for amplifying the difference between the first and second voltages, said amplifier producing an output alternating current proportional to the difference between the intensities of illumination incident upon said first and second transducers, a variable transparency device within the housing interposed in the path of the light beam between the lens system and said beam splitting reflector, said device including two circular rotatable discs each constructed with light absorbing media which vary the light transmission through the discs as they are turned on a common axis but in opposite directions, and a reversible two-phase motor having one of its phases connected to the output of the amplifier and its second phase connected to said external source with its shaft coupled to said rotatable discs for rotating them in opposite directions and varying the light intensity transmitted to the camera by the lens system and beamsplitter.

References Cited in the file of this patent

UNITED STATES PATENTS

| | | |
|---|---|---|
| 2,295,536 | Albersheim | Sept. 15, 1942 |
| 2,369,473 | Luboshez | Feb. 13, 1945 |
| 2,501,365 | Varden | Mar. 21, 1950 |
| 2,655,848 | Gray | Oct. 20, 1953 |
| 2,683,402 | Bruck | July 13, 1954 |
| 2,861,193 | Miller | Nov. 18, 1958 |